(12) United States Patent
Nefcy et al.

(10) Patent No.: US 9,988,036 B2
(45) Date of Patent: Jun. 5, 2018

(54) CLUTCH AND ELECTRIC MACHINE CONTROL FOR DRIVELINE DAMPING

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/478,194

(22) Filed: Sep. 5, 2014

(65) Prior Publication Data

US 2016/0068153 A1 Mar. 10, 2016

(51) Int. Cl.
| | |
|---|---|
| *B60W 20/10* | (2016.01) |
| *B60L 15/20* | (2006.01) |
| *B60W 10/02* | (2006.01) |
| *B60W 10/08* | (2006.01) |
| *B60W 30/20* | (2006.01) |
| *B60K 6/387* | (2007.10) |
| *B60K 6/547* | (2007.10) |
| *B60W 20/19* | (2016.01) |
| *B60W 20/17* | (2016.01) |
| *B60K 6/48* | (2007.10) |

(52) U.S. Cl.
CPC .......... *B60W 10/026* (2013.01); *B60K 6/387* (2013.01); *B60K 6/547* (2013.01); *B60W 10/08* (2013.01); *B60W 20/10* (2013.01); *B60W 20/17* (2016.01); *B60W 20/19* (2016.01); *B60W 30/20* (2013.01); *B60K 2006/4825* (2013.01); *B60W 2030/203* (2013.01); *B60W 2510/087* (2013.01); *B60W 2510/244* (2013.01); *B60W 2710/024* (2013.01); *B60W 2710/025* (2013.01); *B60W 2710/083* (2013.01); *Y02T 10/6252* (2013.01); *Y02T 10/7258* (2013.01); *Y10S 903/93* (2013.01)

(58) Field of Classification Search
CPC ......... B60W 2510/0275; B60W 20/40; B60W 10/10; B60W 30/20; B60W 20/10; B60W 30/18; B60W 10/11; B60W 10/30; B60W 2540/10; B60W 20/13; B60W 10/023; B60W 20/30; B60W 20/11; B60W 20/17
USPC .... 701/22, 103, 54, 67, 1, 104, 48, 53, 112; 180/65.265, 65.275, 9.1, 9.32, 220, 65.29; 477/5, 3, 4, 174, 167, 168, 27, 45
See application file for complete search history.

(56) References Cited

U.S. PATENT DOCUMENTS

| | | | | |
|---|---|---|---|---|
| 4,457,411 | A * | 7/1984 | Hiramatsu | F16D 47/06 192/3.31 |
| 4,703,840 | A | 11/1987 | Bopp | |
| 4,706,790 | A * | 11/1987 | Lockhart | F16H 61/143 192/3.3 |
| 5,062,517 | A | 11/1991 | Muchmore et al. | |

(Continued)

*Primary Examiner* — Jelani A Smith
*Assistant Examiner* — Luis A Martinez Borrero
(74) *Attorney, Agent, or Firm* — David B. Kelley; Brooks Kushman P.C.

(57) ABSTRACT

A vehicle includes an engine, a traction motor, a clutch, and a controller. The clutch selectively couples the traction motor to wheels. The controller, in response to a torque output by the fraction motor achieving a torque limit while operating to partially satisfy a demand for driveline damping and while the clutch is locked, slips the clutch to completely satisfy the demand for driveline damping.

17 Claims, 2 Drawing Sheets

(56) References Cited

U.S. PATENT DOCUMENTS

| | | | | |
|---|---|---|---|---|
| 5,085,617 | A | 2/1992 | Stretch | |
| 5,537,967 | A * | 7/1996 | Tashiro | B60K 6/485 123/192.1 |
| 5,839,084 | A * | 11/1998 | Takasaki | B60K 17/35 701/67 |
| 7,017,348 | B2 * | 3/2006 | Tajima | B60K 6/485 60/706 |
| 7,037,239 | B2 * | 5/2006 | Werner | B60W 10/02 477/176 |
| 7,058,487 | B2 * | 6/2006 | Hara | B60K 6/48 701/1 |
| 7,074,160 | B1 * | 7/2006 | Inoue | B60K 28/165 477/180 |
| 7,089,095 | B2 * | 8/2006 | Takami | B60K 6/485 701/22 |
| 7,099,757 | B2 * | 8/2006 | Niki | B60K 6/48 180/65.25 |
| 7,222,011 | B2 | 5/2007 | Smith et al. | |
| 7,267,211 | B2 * | 9/2007 | Yamashita | F16F 15/12366 192/109 R |
| 7,520,353 | B2 * | 4/2009 | Severinsky | B60H 1/004 180/65.28 |
| 7,759,885 | B2 * | 7/2010 | Yamada | B60L 15/20 318/400.02 |
| 7,769,517 | B2 * | 8/2010 | Segawa | F16H 61/143 192/85.01 |
| 7,896,116 | B2 * | 3/2011 | Tatematsu | B60W 10/26 180/65.21 |
| 7,963,353 | B2 * | 6/2011 | Tatematsu | B60K 6/26 180/65.22 |
| 8,132,635 | B2 * | 3/2012 | Fujimoto | B60W 10/02 180/65.21 |
| 8,187,146 | B2 * | 5/2012 | Allgaier | B60K 6/48 180/65.28 |
| 8,195,352 | B2 | 6/2012 | Morris | |
| 8,241,174 | B2 * | 8/2012 | Wallner | B60K 6/365 477/5 |
| 8,392,079 | B2 * | 3/2013 | Oda | B60W 10/06 477/107 |
| 8,874,295 | B2 * | 10/2014 | Terakawa | B60W 10/02 180/65.265 |
| 8,882,636 | B2 * | 11/2014 | Pietron | B60W 10/02 477/176 |
| 8,892,280 | B2 * | 11/2014 | Kinoshita | B60G 17/0164 318/139 |
| 8,892,290 | B2 * | 11/2014 | Reed | B60W 10/196 180/65.1 |
| 8,924,062 | B2 * | 12/2014 | Reed | B60W 10/02 701/22 |
| 8,965,616 | B2 * | 2/2015 | Gibson | B60W 20/1084 477/180 |
| 8,989,936 | B2 * | 3/2015 | Takamura | B60K 6/48 180/65.25 |
| 9,096,224 | B2 * | 8/2015 | Terakawa | B60K 6/48 |
| 9,108,614 | B2 * | 8/2015 | Doering | B60W 10/02 |
| 9,108,632 | B2 * | 8/2015 | Gibson | B60W 20/10 |
| 9,758,160 | B2 * | 9/2017 | Gibson | F02N 11/006 |
| 9,791,040 | B2 * | 10/2017 | Nedorezov | F16H 61/0251 |
| 2004/0152558 | A1 * | 8/2004 | Takami | B60K 6/485 477/3 |
| 2004/0216979 | A1 * | 11/2004 | Yamashita | F16F 15/12366 192/212 |
| 2005/0038576 | A1 * | 2/2005 | Hara | B60K 6/48 701/22 |
| 2006/0231306 | A1 * | 10/2006 | Severinsky | B60H 1/004 180/65.23 |
| 2007/0056784 | A1 * | 3/2007 | Joe | B60K 6/48 180/65.245 |
| 2007/0243971 | A1 * | 10/2007 | Brevick | F16H 61/143 477/70 |
| 2009/0118945 | A1 * | 5/2009 | Heap | B60K 6/26 701/54 |
| 2009/0312144 | A1 * | 12/2009 | Allgaier | B60K 6/48 477/5 |
| 2013/0151099 | A1 * | 6/2013 | Chae | F16H 61/04 701/67 |
| 2013/0186724 | A1 * | 7/2013 | Miyahara | F16F 15/145 192/3.23 |
| 2013/0274969 | A1 * | 10/2013 | Wang | B60W 10/08 701/22 |
| 2013/0296114 | A1 * | 11/2013 | Nefcy | B60K 6/48 477/5 |
| 2013/0296116 | A1 | 11/2013 | Dai et al. | |
| 2013/0296123 | A1 * | 11/2013 | Doering | B60W 10/02 477/5 |
| 2013/0296130 | A1 * | 11/2013 | Banker | B60W 10/184 477/27 |
| 2013/0296136 | A1 * | 11/2013 | Doering | B60K 6/48 477/167 |
| 2013/0297127 | A1 * | 11/2013 | Takamura | B60K 6/48 701/22 |
| 2014/0195078 | A1 * | 7/2014 | Severinsky | B60H 1/004 701/22 |
| 2014/0222269 | A1 * | 8/2014 | Tsutsumi | B60W 20/40 701/22 |
| 2015/0175151 | A1 * | 6/2015 | Schmoll Genannt Eisenwerth | B60W 10/02 701/22 |
| 2017/0291599 | A1 * | 10/2017 | Pietron | B60W 20/40 |

\* cited by examiner

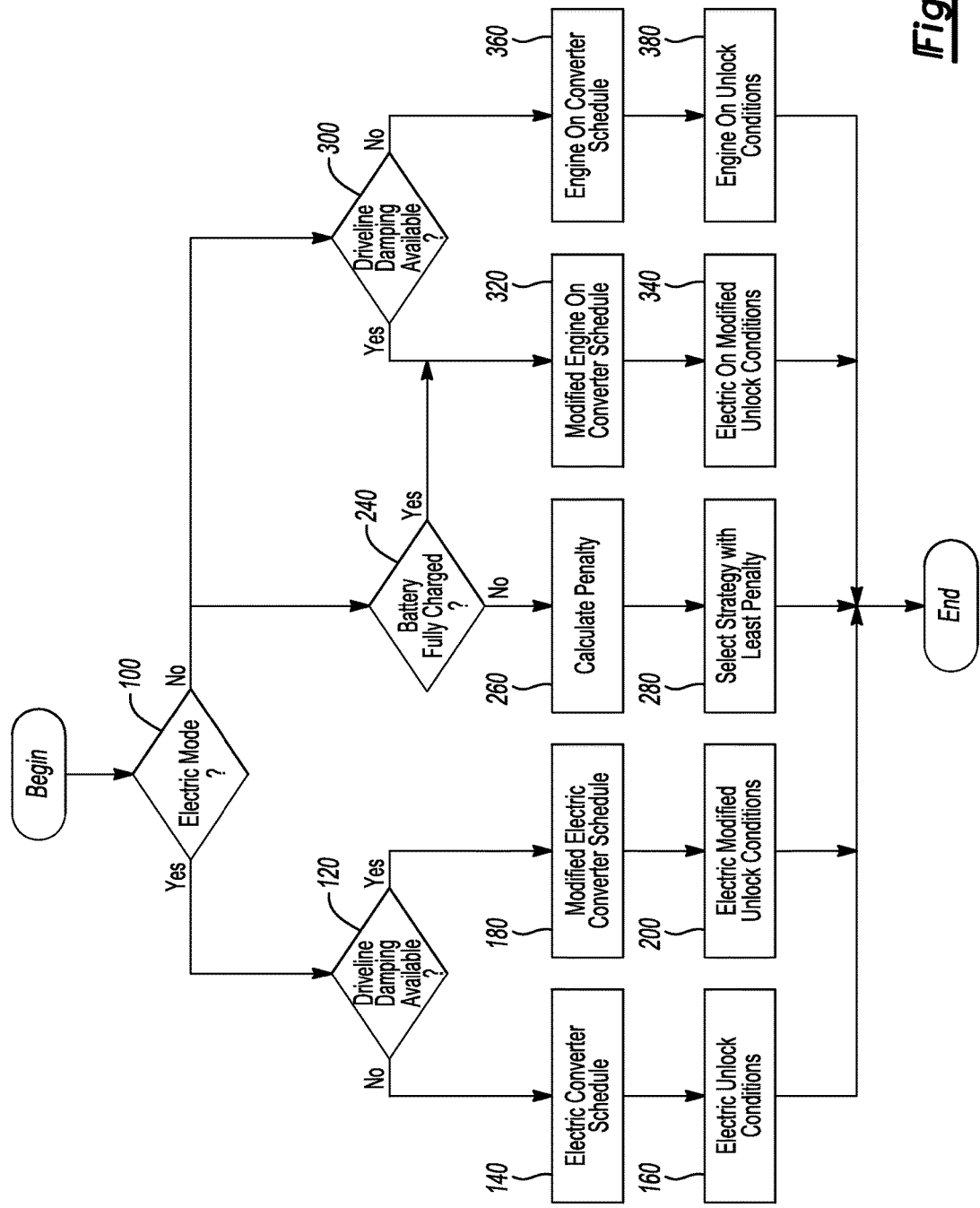

CLUTCH AND ELECTRIC MACHINE CONTROL FOR DRIVELINE DAMPING

TECHNICAL FIELD

The present disclosure relates to damping noise, vibration, and harshness in hybrid electric vehicles.

BACKGROUND

Sources of noise, vibration, and harshness (NVH) within a vehicle may include the engine, the driveline, or contact between the tire and road surface. NVH from the driveline may affect drivability.

SUMMARY

A method of controlling a vehicle includes, in response to a torque output by an electric machine achieving a torque limit while operating to partially satisfy a demand for driveline damping and while a clutch, coupling the electric machine and wheels, is locked, slipping the clutch to completely satisfy the demand for driveline damping.

A vehicle includes an engine, a traction motor, a clutch configured to selectively couple the motor to wheels, and a controller. The controller, in response to a torque output by the traction motor achieving a torque limit while operating to partially satisfy a demand for driveline damping and while the clutch is locked, slips the clutch to completely satisfy the demand for driveline damping.

A method of controlling a vehicle includes, in response to an engine charging a battery configured to supply power to an electric machine while the electric machine is supplying torque to at least partially satisfy a given demand for driveline damping, reducing the torque and increasing slip of a clutch coupling the electric machine and wheels based on a torque limit of the electric machine.

BRIEF DESCRIPTION OF THE DRAWINGS

FIG. 2 is a flow chart describing control logic for a hybrid electric vehicle.

DETAILED DESCRIPTION

Figure 1:
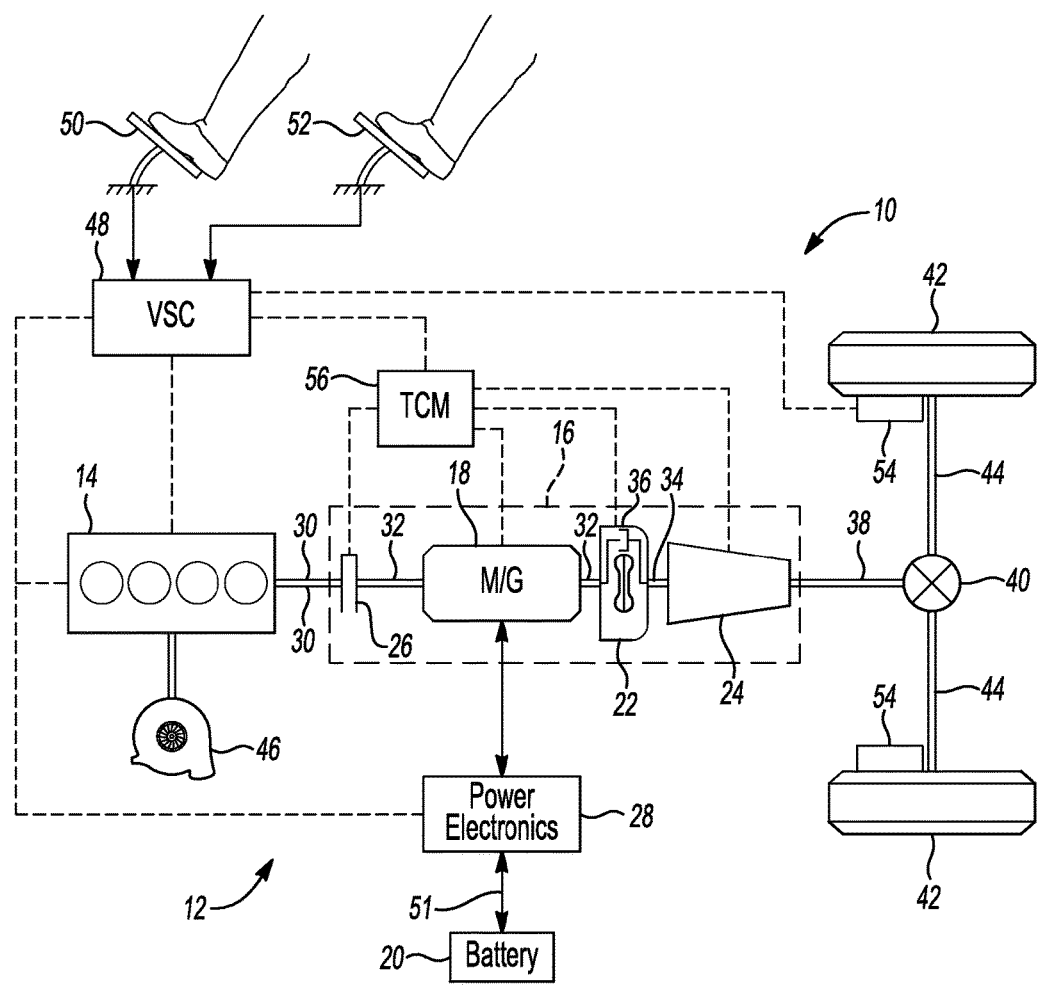
FIG. 1 is a schematic diagram of a hybrid electric vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a schematic diagram of a hybrid electric vehicle (HEV) 10 is illustrated. FIG. 1 illustrates representative relationships among several vehicle components. Physical placement and orientation of the components within the vehicle may vary. The vehicle 10 includes a powertrain 12. The powertrain 12 includes an engine 14 that drives a transmission 16. As will be described in further detail below, the transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18. For example, power electronics may provide three phase alternating current (AC) to the M/G 18.

The engine 14 may additionally be coupled to a turbocharger 46 to provide an air intake pressure increase, or "boost" to force a higher volume of air into a combustion chamber of the engine 14. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The gearbox 24 ultimately provides a powertrain output torque to output shaft 38.

As further shown in the representative embodiment of FIG. 1, the output shaft 38 is connected to a differential 40. The differential 40 drives a pair of wheels 42 via respective axles 44 connected to the differential 40. The differential transmits torque allocated to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The vehicle 10 further includes a foundation brake system 54. The system may comprise friction brakes suitable to selectively apply pressure by way of stationary pads attached to a rotor affixed to the wheels. The applied pressure between the pads and rotors creates friction to resist rotation of the vehicle wheels 42, and is thereby capable of slowing the speed of vehicle 10.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. As discussed in more detail below, the rotational resistance imparted on the shaft through regeneration of energy may be used as a brake to decelerate the vehicle. The disconnect clutch 26 can also be disengaged to decouple the engine 14 from the remainder of the powertrain 12 such that the M/G 18 can operate as the sole drive source for the vehicle 10.

Operation states of the powertrain 12 may be dictated by at least one controller. While illustrated by way of example as a single controller, such as a vehicle system controller (VSC) 48, there may be a larger control system including several controllers. The individual controllers, or the control system, may be influenced by various other controllers throughout the vehicle 10. For example controllers that may be included within representation of the VSC 48 include a transmission control module (TCM), brake system control module (BSCM), a high voltage battery energy control module (BECM), as well as other controllers in communication which are responsible for various vehicle functions. The at least one controller can collectively be referred to as a "controller" that commands various actuators in response to signals from various sensors. The VSC 48 response may serve to dictate or influence a number of vehicle functions such as starting/stopping engine 14, operating the M/G 18 to provide wheel torque or recharge the traction battery 20, select or schedule transmission gear shifts, etc. The VSC 48 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the engine 14, the turbocharger 46, the disconnect clutch 26, the M/G 18, the transmission gearbox 24, torque converter 22, the torque converter bypass clutch 36, and the power electronics 28. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter bypass clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The VSC 48 also includes a torque control logic feature. The VSC 48 is capable of interpreting driver requests based on several vehicle inputs. These inputs may include, for example, gear selection (PRNDL), accelerator pedal inputs, brake pedal input, battery temperature, voltage, current, and battery state of charge (SOC). The VSC 48 in turn may issue command signals to the transmission to control the operation of the M/G 18.

The M/G 18 is also in connection with the torque converter 22 via shaft 32. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. An internal bypass clutch 36 may also be provided such that, when engaged, clutch 36 frictionally or mechanically couples the impeller and the turbine of the torque converter 22, permitting more efficient power transfer. The torque converter bypass clutch 36 may be operated to provide smooth vehicle launch. In contrast, when the bypass clutch 36 is disengaged, the M/G 18 or the engine 14 may not be directly coupled to the differential 40 and the vehicle axles 44. For example, during deceleration the bypass clutch 36 may disengage at low vehicle speeds to allow the engine to idle and deliver little or no output torque to drive the wheels.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the vehicle torque output demanded by the driver.

The driver of vehicle 10 may additionally provide input at brake pedal 52 to create a vehicle braking demand. Depressing brake pedal 52 generates a braking input signal that is interpreted by controller 48 as a command to decelerate the vehicle. The controller 48 may in turn issue commands to cause the application of negative torque to the powertrain output shaft. Additionally or in combination, the controller may issue commands to activate the brake system 54 to apply friction brake resistance to inhibit rotation of the vehicle wheels 42. The negative torque values provided by both of the powertrain and the friction brakes may be allocated to vary the amount by which each satisfies driver braking demand.

The controller 48 may also control the timing of gear shifts within the gearbox 24, as well as engagement or disengagement of the disconnect clutch 26 and the torque converter bypass clutch 36. Like the disconnect clutch 26, the torque converter bypass clutch 36 can be modulated across a range between the engaged and disengaged positions. This may produce a variable slip in the torque converter 22 in addition to the variable slip produced by the hydrodynamic coupling between the impeller and the turbine. Alternatively, the torque converter bypass clutch 36 may be operated as either locked or open without using a modulated operating mode depending on the particular application.

Further, the hydrodynamic coupling between the impeller and the turbine of the torque converter bypass clutch 36 acts as a spring to dampen driveline oscillations caused by noise, vibration, and harshness. Modifying the variable slip of the torque converter bypass clutch 36, as described above, may optimize the damping effect of the torque converter 22. Maintaining a slip or open position of the torque converter bypass clutch 36 may change the fuel efficiency of the vehicle. Therefore, optimizing the damping effect of the torque converter 22 to maintain the locked position improves vehicle fuel economy.

To drive the vehicle with the engine 14, the disconnect clutch 26 is at least partially engaged, but normally locked, to transfer at least a portion of the engine torque through the disconnect clutch 26 to the M/G 18, and then from the M/G 18 through the torque converter 22 and gearbox 24. The M/G 18 may assist the engine 14 by providing additional powered torque to turn the shaft 32. This operation mode may be referred to as a "hybrid mode." As mentioned above, the VSC 48 may be further operable to issue commands to allocate a torque output of both the engine 14 and the M/G 18 such that the combination of both torque outputs satisfies an accelerator input from the driver.

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time in order to conserve fuel, for example. The traction battery 20 transmits stored electrical energy through wiring 51 to power electronics 28 that may include an inverter. The power electronics 28 convert high-voltage direct current from the battery 20 into alternating current for use by the M/G 18. The VSC 48 may further issue commands to the power electronics 28 such that the M/G 18 is enabled to provide positive or negative torque to the shaft 32. This operation where the M/G 18 is the sole motive source may be referred to as an "electric only" operation mode.

Additionally, the M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may also act as a generator during times of regenerative braking in which the kinetic energy of the vehicle is transferred back through the gearbox 24 and is converted into electrical energy for storage in the battery 20.

The M/G 18 may further operate as a driveline damper. Within certain operating conditions, the M/G 18 may also provide driveline damping for oscillations caused by noise, vibration, and harshness. For example, if the M/G 18 is operational in order to provide driveline damping, or if the M/G 18 is not overheated when driveline damping is required, then the M/G 18 may provide driveline damping. Other operating conditions indicative of the M/G 18 availability for driveline damping include but are not limited to such conditions as the battery power limits being above a threshold, the battery state of charge being above a threshold, the temperature of the battery being above or below a threshold, and the temperature of the inverter being above or below a threshold.

This allows for a second device, besides the torque converter bypass clutch 36 to be used to soften the driveline. It may therefore be advantageous to optimize a balance between using the M/G 18 and the torque converter bypass clutch 36 to improve drivability and fuel economy of the vehicle 10. For example, the torque converter bypass clutch 36 engagement schedule could be modified based on the availability of driveline damping from the M/G 18 as a substitute. The torque converter bypass clutch unlock schedule could also be optimized to stay locked or lock in gears in which it is normally unlocked. As discussed above, when the torque converter bypass clutch 36 is in a locked position, overall fuel consumption efficiency is improved. The torque converter bypass clutch unlock schedule and slip conditions may be optimized based on the availability of the M/G 18 to provide driveline damping. Optimizing the slip conditions of the torque converter bypass clutch 36 maximizes the amount of time the torque converter bypass clutch 36 is in a locked position. Maximizing the amount of time the torque converter bypass clutch 36 is locked provides for an optimal fuel efficiency and fuel economy of the vehicle. Optimizing the slip conditions and engagement schedule of the torque converter bypass clutch 36 are within a preferred embodiment and are discussed below, however other clutch slip conditions and engagement schedules may also be optimized. For example, clutches downstream from the M/G 18, such as a launch clutch, may utilize the modified slip conditions and engagement schedules described below to optimize the overall fuel efficiency of the vehicle.

Referring to FIG. 2, control logic for using a modified torque converter bypass clutch unlock schedule is depicted. At 100, the VSC 48 determines if the vehicle 10 is operating in the "electric only" operation mode. As described above, the "electric only" operation mode, determined at 100, occurs when the M/G 18 is the sole provider of torque to the vehicle wheels. Therefore, if at 100 the VSC 48 determines that the vehicle is operating under "electric only" operation mode, then the M/G 18 may be available to damp driveline oscillations to reduce noise, vibration, and harshness.

At 120, the VSC 48 will determine if the M/G 18 is available to damp the driveline oscillations. At 120, the VSC 48 may use a variety of operating conditions of the M/G 18 to determine the amount of driveline damping available from the M/G 18. If the M/G 18 is well charged and has capacity to provide driveline damping, then the VSC 48 may command the M/G 18 to damp driveline oscillations. It may also be determined that the M/G 18, at 120, is capable of providing driveline damping if the M/G is not overheated, if the inverter is not overheated, or if the battery 20 is not overheated. Any operating conditions of the M/G 18 may be used to determine if the M/G 18 is capable to provide driveline damping. For example, when a driveline damping torque output by the M/G 18 is achieving a torque limit, the torque limit decreases as a state of charge of the battery 20 decreases. Further, the torque limit changes as a temperature of the battery 20 changes. Likewise, the torque limit changes as a temperature of the M/G 18 changes.

If at 120, the VSC 48 determines that the M/G 18 is not well charged and capable of providing driveline damping, then an unmodified torque converter bypass clutch unlock schedule is maintained at 160. Likewise, at 140, the VSC 48 may command the torque converter bypass clutch 36 to maintain an unmodified engagement schedule, or slip conditions consistent with the "electric only" operation mode.

If at 120, the VSC 48 determines that the M/G 18 is well charged and capable of providing driveline damping, then the VSC 48 may command the torque converter bypass clutch 36 to engage and unlock consistent with a modified schedule. At 180, the VSC 48 may command the M/G 18 to provide driveline damping and command the torque converter bypass clutch 36 to use a modified engagement schedule. At 180, since the M/G 18 is providing the driveline damping, the torque converter bypass clutch 36 slip conditions may be optimized to allow for improved drivability of the vehicle. If the M/G 18 is only able to provide a portion of the damping necessary to partially satisfy the damping demand, then the torque converter bypass clutch engagement schedule may be optimized to allow the torque converter bypass clutch 36 to further damp the oscillations on the driveline. For example, the VSC 48 may command the torque converter bypass clutch 36 to slip to completely satisfy the demand for driveline damping.

Likewise, at 200, the VSC 48 may command the torque converter bypass clutch 36 to use modified unlock conditions. At 200, the torque converter bypass clutch unlock schedule may be optimized to allow the torque converter bypass clutch to maintain a locked position during typically unlocked occasions. As stated above, maintaining a locked position of the torque converter bypass clutch 36 allows for an improved fuel economy of the vehicle. For example, a tip-in event may cost fuel economy if the torque converter bypass clutch 36 is unlocked to damp the driveline. By using the M/G 18 under this condition, the driveline damping function is preserved and fuel economy may be improved. Therefore, by optimizing the conditions under which the torque converter bypass clutch 36 may be locked, the fuel economy of the vehicle may also be optimized. Using the M/G 18 to soften the driveline oscillations in conjunction with the torque converter bypass clutch 36 allows the VSC 48 to provide for optimal drivability and fuel economy.

Referring back to 100, the VSC 48 may also determine if the vehicle is operating in the "hybrid" operation mode. When the vehicle 10 is in the "hybrid" operation mode, the vehicle engine 14 is providing torque to the vehicle wheels. Because the vehicle is in "hybrid" operation mode at 100 and the engine is on, the torque converter bypass clutch 36 may be providing torsional isolation. Torsional isolation occurs between the two torque producers, the M/G 18 and the engine 14, and the driveline. Sudden torque changes without torsional isolation produce noise, vibration, and harshness on the vehicle driveline.

If at 100 the VSC 48 determines that the vehicle is operating in the "hybrid" operation mode, then the VSC 48 may look at certain operating conditions of the M/G 18, at 240. The operating conditions, at 240, of the M/G 18 allow the VSC 48 to determine if the M/G 18 has sufficient charge and capability to provide driveline damping. For example, the VSC 48 may check if the battery 20 is fully charged, at 240.

If the battery 20 is fully charged at 240, the VSC 48 may determine if the M/G 18 has sufficient charge and capacity to provide driveline damping at 300. If at 300 the VSC 48 determines that the M/G 18 does not have sufficient charge or capacity to provide driveline damping, the VSC 48 commands the torque converter bypass clutch 36 to follow an unmodified engagement schedule at 360. The unmodified engagement schedule provides for normal operation of the torque converter bypass clutch 36 during "hybrid" operation mode. Likewise, if the VSC 48 determines that the M/G 18 is not able to provide driveline damping, the VSC 48 commands the torque converter bypass clutch 36 to follow an unmodified unlock condition at 380. The unmodified unlock conditions provide for normal operation of the torque converter bypass clutch 36 during "hybrid" operation mode.

If the engine 14 is connected, checking the vehicle battery 20, at 240, is a preferred but non-limiting embodiment. The VSC 48 may use any operating conditions of the M/G 18 that affect fuel economy and drivability. For example, if at 240 the battery 20 is not fully charged, the VSC 48 may calculate a fuel economy penalty at 260. The fuel economy penalty at 260 compares a fuel economy penalty of the scheduled torque converter bypass clutch slip with a fuel economy penalty of maintaining battery charge and providing M/G 18 driveline damping. Therefore, in response to the engine 14 charging the battery 20 while the M/G 18 is supplying torque to at least partially satisfy a given demand for driveline damping, the VSC 48 may command the M/G 18 to reduce the driveline damping torque and increase the slip of the torque converter bypass clutch 36 based on a torque limit of the M/G 18. Increased engine speed may allow for a more efficient engine power to charge the battery. At 280, the VSC 48 may select the strategy with the least fuel economy penalty. This allows the VSC 48 to improve the fuel economy of the vehicle while delivering driver demanded torque and charging the battery.

The VSC 48 may also be programmed to calculate a drivability penalty of maintaining battery charge and providing motor damping. The drivability penalty may be based on any operating conditions of the M/G 18 affecting drivability or fuel economy. For example at 260, the VSC 48 may compare the drivability penalty of the scheduled bypass torque converter slip with the drivability penalty of maintaining battery charge and providing motor damping. Likewise at 260, the VSC 48 may also compare the drivability penalty of the scheduled bypass torque converter slip with the fuel economy penalty of maintaining battery charge and providing motor damping, or vice versa. At 280, the VSC 48 may also select a strategy with the least drivability penalty. At 280, the VSC 48 may further be programmed to select a strategy modulating the drivability penalty and the fuel economy penalty during various vehicle operations affecting overall vehicle performance.

If at 240 the operating conditions of the M/G 18 suggest sufficient charge and capacity to provide driveline damping, the VSC 48 may determine if driveline damping from the M/G 18 is available at 300. If the M/G 18 is available to provide driveline damping, then the VSC 48 commands the torque converter bypass clutch 36 to follow a modified "hybrid" operation mode engagement schedule at 320. At 320, the VSC 48 may calculate a slip penalty and command the M/G 18 to provide enough driveline damping to compensate for the slip penalty. The slip penalty may be based on the slip conditions of the torque converter bypass clutch 36 and the power from the M/G 18 to provide driveline damping. By optimizing the engagement schedule of the torque converter bypass clutch 36 with the power needed to perform driveline damping, overall vehicle drivability is improved.

Likewise, the VSC 48 may also command the torque converter bypass clutch 36 to follow a modified unlock schedule at 340. At 340, the VSC 48 calculates an unlocked penalty and commands the M/G 18 to provide enough driveline damping to compensate for the unlocked penalty.

The unlocked penalty may be based on the unlock conditions of the torque converter bypass clutch 36 and the power from the M/G 18 to provide driveline damping. By optimizing the unlock schedule of the torque converter bypass clutch 36 with the power needed to perform driveline damping, overall vehicle fuel economy is improved. Therefore, softening the vehicle driveline using the torque converter in conjunction with the M/G 18 improves overall vehicle performance.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of controlling a vehicle comprising:
in response to a torque output by an electric machine achieving a torque limit while operating to partially satisfy a demand for driveline damping and while a clutch, coupling the electric machine and wheels, is locked, reducing the torque output and increasingly slip the clutch to completely satisfy the demand for driveline damping.

2. The method of claim 1, wherein the torque limit decreases as a state of charge of a battery configured to supply power to the electric machine decreases.

3. The method of claim 1, wherein the torque limit changes as a temperature of a battery configured to supply power to the electric machine changes.

4. The method of claim 1, wherein the torque limit changes as a temperature of the electric machine changes.

5. The method of claim 1, wherein the clutch is a lock-up clutch of a torque converter.

6. A vehicle comprising:
an engine;
a traction motor;
a clutch configured to selectively couple the motor to wheels; and
a controller configured to, in response to a torque output by the traction motor achieving a torque limit while operating to partially satisfy a demand for driveline damping and while the clutch is locked, reduce the torque output and increasingly slip the clutch to completely satisfy the demand for driveline damping.

7. The vehicle of claim 6, further comprising a torque converter, wherein the clutch is a lock-up clutch of the torque converter.

8. The vehicle of claim 6, wherein the torque limit decreases as a state of charge of a battery configured to supply power to the traction motor decreases.

9. The vehicle of claim 6, wherein the torque limit changes as a temperature of a battery configured to supply power to the traction motor changes.

10. The vehicle of claim 6, wherein the torque limit changes as a temperature of the traction motor changes.

11. A method of controlling a vehicle comprising:
in response to an engine charging a battery configured to supply power to an electric machine while the electric machine is supplying torque to at least partially satisfy a given demand for driveline damping, reducing the torque and increasing slip of a clutch coupling the electric machine and wheels based on a torque limit of the electric machine.

12. The method of claim 11, wherein an amount of the increase is greater when the electric machine is supplying the torque at the torque limit as compared with when the electric machine is supplying the torque less than the torque limit.

13. The method of claim 11, wherein the reduced torque and increased slip act to completely satisfy the given demand for driveline damping.

14. The method of claim 11, wherein the torque limit decreases as a state of charge of the battery decreases.

15. The method of claim 11, wherein the torque limit changes as a temperature of the battery changes.

16. The method of claim 11, wherein the torque limit changes as a temperature of the electric machine changes.

17. The method of claim 11, wherein the clutch is a lock-up clutch of a torque converter.

* * * * *